United States Patent [19]
Stoakes et al.

[11] 3,746,974
[45] July 17, 1973

[54] OIL PERMITTIVITY SENSOR

[75] Inventors: Donald S. Stoakes; Kenneth D. Brock, both of Minneapolis, Minn.

[73] Assignee: Thexton Manufacturing Company, St. Louis Park, Minn.

[22] Filed: Mar. 25, 1971

[21] Appl. No.: 127,879

[52] U.S. Cl.............................. 324/61 R, 324/61 P
[51] Int. Cl............................................. G01r 27/26
[58] Field of Search................. 324/61, 61 P; 73/54, 73/61.1, 64

[56] References Cited
UNITED STATES PATENTS
2,754,478  7/1956  Goldsmith........................ 324/61 R
2,721,798  11/1955  Hare et al........................ 324/61 R
3,320,528  5/1967  Esenwein........................ 324/61 R Primary Examiner—Alfred E. Smith
Attorney—Williamson, Palmatier & Bains

[57] ABSTRACT

A sensor for determining permittivity of oil and the lubricating ability thereof including capacitor electrodes spaced from each other with the oil sample therebetween, the electrodes respectively having surfaces obliquely confronting each other and lying transverse to each other; the electrodes being respectively formed into the peripheral wall and bottom of an oil cup.

3 Claims, 4 Drawing Figures

PATENTED JUL 17 1973
3,746,974
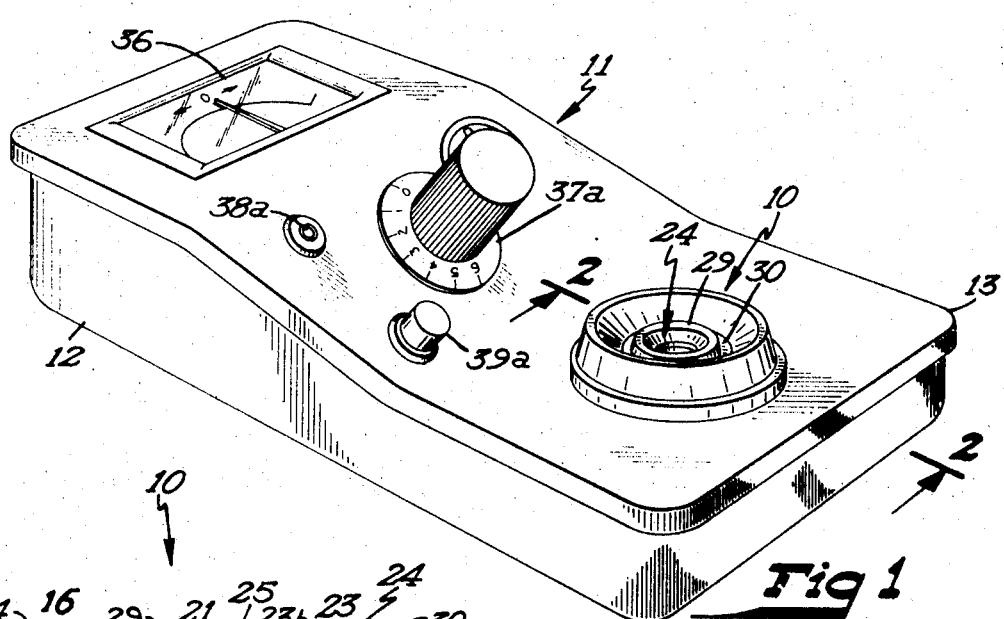
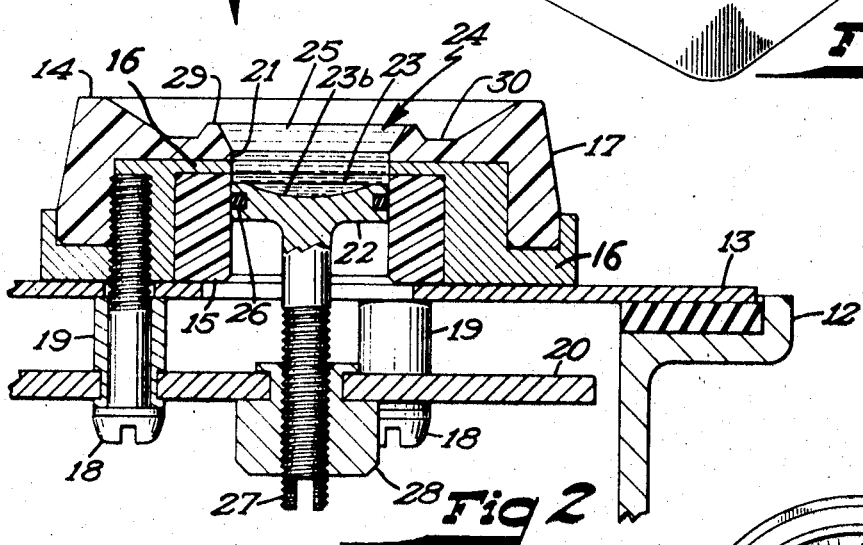
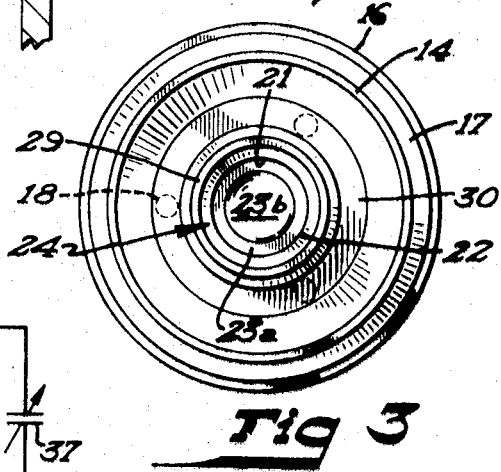
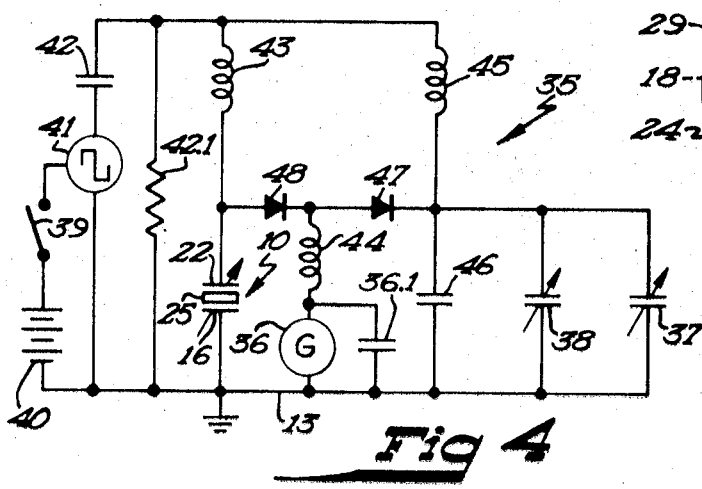
Fig 1
Fig 2
Fig 3
Fig 4
INVENTORS
DONALD S. STOAKES,
KENNETH D. BROCK
BY
Williamson, Palmatier
+ Bains
ATTORNEYS

OIL PERMITTIVITY SENSOR

BACKGROUND OF THE INVENTION

After lubricating oil has been used for a time in an internal combustion engine, lubricating capability of the oil will be materially reduced. It is desirable to know the state of the oil so that the oil can be changed at the proper time.

It is principally oxidation that adversely affects the lubricating ability of oil. Such oxidation is the term in the trade for materials which might otherwise be called sludge, including blow-by solids from the combustion chambers, and gums and varnishes similarly finding their way into the lubricating oil from the combustion chamber.

Other contaminants are also frequently found in oil which adversely affect the lubricating ability of the oil, including water, ethylene glycol, metal particles, gasoline and fuel. Each of these various contaminants, including oxidation, changes the dielectric constant, and thereby the permittivity, of the lubricating oil so that by very accurately measuring the change of capacity in a capacitance-type sensor, the relative lubricating ability of the oil can be determined.

Previously, sensors for this general purpose have been highly subject to conditions clearly non-related to the lubricating ability of the oil, such as the temperature of the sample of the oil tested, or the quantity (depth) of oil in the sample. As a result, the results obtained were not reliable to the extent desirable.

BRIEF SUMMARY OF THE INVENTION

The sensor comprises a capacitor wherein the electrodes or plates are oriented relative to each other in such a way that the capacitor has a minimum of static capacity. Supplying oil between the electrodes to constitute the dielectric, will therefore have the maximum effect upon the capacity of the capacitor; and there will be a maximum change in the dielectric characteristics between new oil and used oil. Maximum sensitivity capability is thereby achieved.

The electrode surfaces confront each other obliquely and the surfaces lie substantially perpendicular to each other. The electrodes are closest to each other only along spaced and juxtaposed edges.

The sensor is incorporated into a small cup or container for holding the oil sample. One electrode is formed in the upright peripheral wall of the cup, and is illustrated to have a cylindrical surface. The second electrode is formed in the bottom of the cup, which is variably spaced from the first electrode.

The second electrode includes a peripheral band around the bottom of the cup, and undoubtedly this band effects a substantial portion of capacitance of the capacitor because of the relatively close proximity to the first electrode. The area of the second electrode is increased by including the central area of the cup bottom, to increase the capacitance of the capacitor; and this central area may be dished or recessed to make the sensor quite insensitive to height of the oil sample. In small samples of oil, the height of the oil in the cup, and therefore the volume, may slightly change the effective capacitance; and the dishing of the lower or second electrode provides compensation for the variance of contour of the top oil surface as between hot and cold oils.

BRIEF DESCRIPTION OF THE DRAWINGS

FIG. 1 is a perspective view of the complete tester incorporating the sensor therein.

FIG. 2 is an enlarged detail section view taken approximately at 2—2 in FIG. 1.

FIG. 3 is an enlarged detail top plan view of the sensor.

FIG. 4 is a typical bridge circuit for use with the sensor.

DETAILED DESCRIPTION OF THE INVENTION

The sensor is indicated in general by number 10, and is intended for use as a part of an oil testing apparatus 11 which has a housing 12 and a top metal deck 13 providing a ground for the electrical circuit.

The sensor 10 is supported on the deck 13 and includes an outer shell 14, and a central core 15, both of which are of a low dielectric plastic material, such as high density polyethylene. The sensor also includes a metal electrode 16, preferably of an aluminum alloy, and sandwiched between the shell 14 and the core 15, and securely bonded to the shell 14 and core 15 by adhesive. The shell 14, core 15, and electrode 16, being securely bonded together, form a solid body portion 17 of the sensor. The body 17 is drilled and tapped to receive mounting screws 18 attaching the body 17 to the deck 13. The mounting screws 18 extend through spacer sleeves 19 which mount an insulating panel 20 and thereby the screws 18 affix the panel 20 to the deck 13, but in spaced relation therewith.

A large opening 21 is formed in the body 17, through the center of each of the shell 14, core 15 and electrode 16, so as to receive a movable metal base electrode 22 which extends entirely across and fills the opening 21. The top surface 23 of the base electrode 22 cooperates with the periphery of the opening 21 to define a cup 24 to hold a sample of the oil 25. The cylindrical periphery of electrode 22 is grooved to receive a sealing ring 26 so as to define an oil tight relation with the plastic core 15 and prevent any leakage from the cup. The base electrode 22 has an elongate stem 27 inserted into a tapped fitting 28 on panel 20 so as to facilitate movement of the base electrode 22 along the peripheral wall of the cup and toward and away from the annular electrode 16.

The cup 24 will hold only a small quantity of oil, as the sample being tested, and the opening or peripheral wall 21 may be approximately a half inch in diameter. The spacing between the capacitor electrodes 22 and 16 is ordinarily in the range of 5 to 25 thousandths of an inch. The electrode spacing is adjusted such that the capacity of sensor 10 will resonate with coil 43.

It will be noted that the annular electrode 16 defines a portion of the peripheral wall of the cup 24, and the electrode 16 is very closely adjacent the base electrode 22, whereas the annular electrode 16 is spaced well below the upper edge 29 of the cup, the height of which exceeds the height of the annular electrode 16 by several times.

The shell portion 14 of the body 17 defines a shallow sump 30 adjacent the upper edge of the cup for receiving oil spillage.

The top surface 23 of the base electrode 22 has a planar area or band 23a about its outer periphery and of a width approximately equaling the height of the annular electrode 16 at the peripheral wall or opening 21.

It will be understood that this outer band or area 23a of the top surface of electrode 22 lies in a plane and lies perpendicular to the cylindrical inner peripheral surface of the annular electrode 16. The central area 23b of the top surface 23 of the base electrode 22 is slightly dished or recessed beneath the level of the planar peripheral area 23a, and this recessed area 23b also lies trasverse to the inner cylindrical peripheral surface of the annular electrode 16.

The case 12 confines the circuitry indicated in general by numeral 35, and which defines a bridge circuit to sense and indicate an unbalanced condition caused by the sensing of a changed permittivity of the oil sample as compared to a pre-established standard. The deck 13 of the tester 11 mounts a meter, and particularly a galvanometer 36 to indicate the magnitude and direction of current passing therethrough. A dial 37a having a manually rotatable knob is connected with a variable condenser 37 in the bridge circuit. Another variable capacitor 38 is adjusted by a stem 38a with a screwdriver slot at the face of the deck 13. A normally open switch 39 is operated by a push button 39a on the face of the deck 13.

The battery 40 is connected at one side to the ground which is the same as deck 13, and at the other side to the normally open switch 39. Switch 39 is also connected to a square wave generator 41 for supplying energy thereto. The square wave generator or oscillator 41 may produce approximately 5 megacycles at approximately 5 volts peak to peak, and the generator 41 should be quite stable from a frequency standpoint. One side of the generator is connected to ground 13, and the output from the square wave generator 41 is supplied through a blocking capacitor 42 which is low impedance to the output frequencies of the generator, to two separate coils 43 and 45 and a shunt resistor 42.1. Coil 43 is connected in series with the sensor 10, and particularly to the base electrode 22 thereof; the other annular electrode 16 of the sensor-capacitor 10 being connected to ground 13. The dielectric of the sensor-capacitor 10 is the oil 25. The other side of resistor 42.1 is connected to ground 13.

The variable capacitors 37 and 38 are connected in parallel with each other and also in parallel with another capacitor 46 which is the predominant capacitor in the bridge circuit and is a fixed capacitor. The three capacitors 37, 38 and 46 are connected at one side to ground or plate 13, and at the other side to the coil 45. A pair of diodes 47 and 48 are connected in series with each other and from the midpoint between coil 43 and sensor 10, and the midpoint between coil 45 and the three parallel capacitors 37, 38 and 46.

One side of R. F. choke coil 44 is connected at the midpoint between the diodes 47, 48. The galvanometer 36 interconnects the other side of coil 44 with ground 13. An R. F. bypass capacitor 36.1 shunts R. F. signals past galvanometer 36 and to ground 13.

The size of coil 43 is selected so that at the approximately 5 megacycle frequency output from the square wave generator 41, the base electrode of the sensor-capacitor 10 may be adjusted by turning the stem 27 so that the sensor-capacitor, with clean oil filling the cup 24, will resonate. At this point of resonance, the series L-C circuit including coil 43 and sensor-capacitor 10 will have a minimum of impedance to the high frequency output of the generator.

The size of coil 45 and capacitors 46 and 38 and 37 are selected so that they also will resonate at the output frequency of the square wave generator; and with clean oil in the cup 24, there will be no D. C. current flow through either of the diodes 47, 48 and therefore the galvanometer 36 will be centered or at zero. The screwdriver slot in the stem 38a facilitates this zero adjustment of the galvanometer for testing a particular oil. The adjustment of the sensor 10 by adjusting the base electrode 22 will be done only once for a particular tester 11 so that a condition of resonance with the coil 43 can be initially achieved. Once this base electrode 22 has been adjusted to achieve resonance, the base electrode will ordinarily be left stationary in the ordinary use of this tester.

When the clean oil is removed from the cup 24, a point of reference will have been established, and the sample of oil containing oxidation, will be poured into the cup 24 so as to determine the permittivity and the relative lubricating capability thereof. It will be observed that because of the difference in the permittivity of the used oil as compared to that of the new oil, the bridge circuit will show some unbalance because of the change in the capacitance of the sensor-capacitor 10. As a result, there will be flow through the galvanometer 36 and the indicator thereof will move away from zero. By adjusting the dial 37a and the capacitance of capacitor 37, the bridge circuit will be brought back into balance. The numbers on the dial 37a, which will have been turned, provide an indication of the relative permittivity and lubricating capability of the sample of oil being tested.

The tester 11 and sensor 10 are effective for indicating the relative permittivity and lubricating capability of the oil sample regardless of whether the sample of oil is cold or hot at approximately engine operating temperature. The top surface of the oil in cup 24 will be slightly crowned or arched with the central portion of the top surface of the oil slightly higher than the upper edge 29 of the cup if the oil sample is relatively cold, such as ambient temperatures during autumn and winter days. On the other hand, if the sample of oil is relatively hot, approximating the operating temperature of oil in an internal combustion engine, the top surface of the sample of oil in the cup 24 has a somewhat concave shape, being dished at the central portion slightly below the level of the edge 29 which will be level with the oil at the periphery.

Even though there is some difference in the elevation of the central portion of the top surface of the oil sample in cup 24, above the base electrode 22 as between hot oil samples and cold oil samples, it has been found that the same permittivity and lubricating ability of the oil is detected by the tester 11 and sensor 10. In other words, this sensor 10 is insensitive to variations in temperature of the oil samples. The correct permittivity and lubricating ability of the oil is detected regardless of the temperature of the oil sample.

Although the concave or recessed surface portion 23b does not lie precisely perpendicular to the internal peripheral surface of annular electrode 16, the surface portion 23b certainly lies transversely of the internal peripheral surface of the electrode 16. The outer area or band 23a of the top surface of electrode 22 does lie perpendicular to the internal cylindrical surface of annular electrode 16, and these two surfaces are responsible for most of the capacitance of the sensor 10.

It will be seen that we have provided a sensor for determining the permittivity and lubricating capability of lubricating oil by creating the electrodes of a capacitor in the peripheral sidewall and bottom of a cup for holding the sample of oil. The bottom electrode and the annular electrode in the peripheral wall of the cup lie transversely of each other and at the periphery lie perpendicular to each other. As a result of the physical construction of the sensor, there is a minimum of static capacity, and a maximum change or deviation between the static capacity and the capacity with oil in the oil cup; and, further, there is a maximum change or deviation between new and used oil. Maximum sensitivity capability is thereby achieved. The base electrode is adjustable for establishing the initial resonance with respect to the coil resonating with the sensor-capacitor 10. The physical construction eliminates heat sensitivity so that there is essentially no variation between the indicated permittivity and lubricating ability of the oil as between samples of hot oil and cold oil. A convenient zero setting is provided for in the circuitry with which the sensor is used.

What is claimed is:

1. A sensor for determining the permittivity and the relative lubricating ability of oil, comprising:
   a cup for an oil sample and having a peripheral wall and a bottom, and
   a pair of spaced oil-engaging capacitor electrodes, one forming a portion of the wall of the cup and the other electrode forming the bottom of the cup and spaced from said one electrode, the bottom of the cup being separate from and movable along the peripheral wall for varying the capacitance of the sensor.

2. The sensor according to claim 1 and a threaded stem mounting the bottom of the cup relative to the peripheral wall for movement therealong.

3. A sensor for determining the dielectric constant and the relative lubricating ability of oil, comprising:
   container means for an oil sample and having a peripheral wall and a bottom,
   the peripheral wall including an annular oil-engaging electrode having a peripheral surface lying flush with the inner surface of the wall,
   the bottom defining a base oil-engaging electrode having a peripheral surface cooperating with the annular electrode and oil sample to define a capacitor, the peripheral surfaces of the annular and base electrodes being substantially perpendicular to each other and in closely spaced and insulated relation, said bottom being formed by the top surface of a base wall entirely filling the peripheral wall and being movable therealong for varying the capacitance between the electrodes.

* * * * *